US009126831B2

(12) United States Patent
Kale (10) Patent No.: US 9,126,831 B2
(45) Date of Patent: Sep. 8, 2015

(54) HYDROGEN/SYNGAS GENERATOR WITH SAMPLING PORTS

(75) Inventor: Ganesh Ravindra Kale, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 394 days.

(21) Appl. No.: 13/636,341

(22) PCT Filed: Mar. 31, 2011

(86) PCT No.: PCT/IB2011/000691
§ 371 (c)(1),
(2), (4) Date: Feb. 1, 2013

(87) PCT Pub. No.: WO2011/121433
PCT Pub. Date: Oct. 6, 2011

(65) Prior Publication Data
US 2013/0129610 A1 May 23, 2013

(30) Foreign Application Priority Data
Mar. 31, 2010 (IN) .............................. 769/DEL/2010

(51) Int. Cl.
*B01J 7/00* (2006.01)
*C01B 3/36* (2006.01)
(Continued)

(52) U.S. Cl.
CPC .................. *C01B 3/34* (2013.01); *B01J 8/0411* (2013.01); *B01J 8/0415* (2013.01); *B01J 8/0496* (2013.01);
(Continued)

(58) Field of Classification Search
CPC ............. B01J 2208/00203; B01J 2208/00141; B01J 2208/0053; B01J 8/0453; B01J 8/067; B01J 2208/025; B01J 8/0285; B01J 8/048; B01J 2208/00309; B01J 2208/00132; B01J 2208/00194; B01J 2219/00083; C01B 2203/044; C01B 3/48; C01B 2203/0233; C01B 2203/0244; C01B 2203/047; C01B 3/382; C01B 2203/0283; C01B 2203/82; C01B 2203/0288; C01B 2203/0883
See application file for complete search history.

(56) References Cited

U.S. PATENT DOCUMENTS 7,066,973 B1 6/2006 Bentley et al.
2002/0031695 A1* 3/2002 Smotkin .......................... 429/30
(Continued)

FOREIGN PATENT DOCUMENTS

| EP | 1 987 876 A1 | 11/2008 |
| WO | WO 00/66487 A1 | 11/2000 |
| WO | WO 2008/063485 A2 | 5/2008 |

OTHER PUBLICATIONS

International Search Report issued in International Patent Application No. PCT/IB2011/000691 dated Aug. 17, 2011.
(Continued)

*Primary Examiner* — Imran Akram
(74) *Attorney, Agent, or Firm* — Oliff PLC (57) ABSTRACT

The present invention relates to a compact, concentric auto thermal hydrogen/syngas generator for production of hydrogen/syngas without any external heating. Further, the auto thermal hydrogen/syngas generator of the present invention involves combination of reactions such as partial oxidation, steam reforming, dry reforming, auto thermal reforming, dry autothermal reforming, water gas shift, preferential oxidation or methanation that takes place without external heating, for converting air, steam and fuel into a reformate mainly containing CO, $CO_2$, $N_2$, $CH_4$ and $H_2O$ which is subsequently converted to hydrogen/syngas as a feed for fuel cell or syngas applications.

17 Claims, 5 Drawing Sheets

(51) Int. Cl.
  *C01B 3/34* (2006.01)
  *B01J 8/04* (2006.01)
  *C01B 3/38* (2006.01)
  *C01B 3/48* (2006.01)

(52) U.S. Cl.
  CPC . *C01B 3/382* (2013.01); *C01B 3/48* (2013.01); *B01J 2208/0053* (2013.01); *B01J 2208/00141* (2013.01); *B01J 2208/00203* (2013.01); *B01J 2208/00309* (2013.01); *B01J 2208/00362* (2013.01); *B01J 2208/00504* (2013.01); *C01B 2203/025* (2013.01); *C01B 2203/0233* (2013.01); *C01B 2203/0238* (2013.01); *C01B 2203/0244* (2013.01); *C01B 2203/0288* (2013.01); *C01B 2203/044* (2013.01); *C01B 2203/047* (2013.01); *C01B 2203/0415* (2013.01); *C01B 2203/0445* (2013.01); *C01B 2203/0475* (2013.01); *C01B 2203/066* (2013.01); *C01B 2203/0872* (2013.01); *C01B 2203/0894* (2013.01); *C01B 2203/1011* (2013.01); *C01B 2203/1052* (2013.01); *C01B 2203/1064* (2013.01); *C01B 2203/1082* (2013.01)

(56) References Cited

U.S. PATENT DOCUMENTS

| | | | |
|---|---|---|---|
| 2002/0083646 A1 | 7/2002 | Deshpande et al. | |
| 2002/0094310 A1 | 7/2002 | Krause et al. | |
| 2002/0172630 A1* | 11/2002 | Ahmed et al. | 422/190 |
| 2003/0021742 A1 | 1/2003 | Krause et al. | |
| 2003/0046867 A1* | 3/2003 | Woods et al. | 48/127.9 |
| 2003/0051405 A1 | 3/2003 | Childress et al. | |
| 2004/0226217 A1* | 11/2004 | Ahmed et al. | 48/127.9 |
| 2007/0000173 A1 | 1/2007 | Boe et al. | |
| 2008/0268301 A1* | 10/2008 | Lee et al. | 429/17 |

OTHER PUBLICATIONS

Written Opinion issued in International Patent Application No. PCT/IB2011/000691 dated Aug. 17, 2011.

* cited by examiner

Data File :      C:\Winchrom06Ex\new analysis\test23.Dat
Method File :    C:\Winchrom06Ex\gas.MET
Sample Name :    LTS
Detector :       TCD
System :         GC
Run Date :       16/12/2010

Analysis Type :  External Standard
Time :           5:18:59 PM
Chan No :        Chan 1

AREA STANDARD(with amount, RF):

| Sr. No. | Component Name | Ret. Time | Area u Volt Sec | Amount | Response Factor | Peak Type | ID Type |
|---|---|---|---|---|---|---|---|
| 1 | CO2 | 0.88 | 4470.4000 | 16.3500 | 0.0002 | BP | |
| 2 | H2 | 1.50 | 201163.2876 | 45.8000 | 1.301E-05 | PV | |
| 3 | N2 | 3.21 | 10188.1714 | 37.6000 | 0.0002 | BB | |
| 4 | CH4 | 5.13 | 8267.2571 | 0.0200 | 1.382E-07 | BB | |
| 5 | CO | 6.58 | 10968.6286 | 0.0100 | 5.210E-08 | BB | |
| | | | 235057.7447 | 99.7800 | | | |

SUMMARY

Total Peaks :              6
Multiplication Factor :    1.0000
Sample Amount :            100.0000

Dilution Factor :          1.0000
Syssuit Standards :        IP
ISTD Amount :              0.0

HYDROGEN/SYNGAS GENERATOR WITH SAMPLING PORTS

FIELD OF THE INVENTION

The invention relates to a compact desktop hydrogen/syngas generator or fuel processor to produce hydrogen/syngas to directly feed it to fuel cell or syngas feed applications. More particularly, the present invention provides a process for preparation of hydrogen gas/syn gas as in the said generator.

BACKGROUND OF THE INVENTION & DESCRIPTION OF PRIOR ART

A hydrogen/syngas generator or fuel processor is a device that can convert a fuel into a product gas containing hydrogen/syngas rich gas stream. The syngas can be converted to hydrogen rich gas using a series of water gas shift, preferential oxidation or methanation reactors. There are several designs available for a fuel processor or hydrogen/syngas generator in various prior art documents, but few relate to compact, thermally integrated, fuel processor for producing hydrogen rich gas for directly delivering it to fuel cell or syngas requiring applications. Also current designs are complicated, require external heating, have low thermal efficiency, and are bulky and expensive. Also, the product gas has to be processed before feeding it to the fuel cell or syngas applications.

Reference may be made to patent US 2002/083646 titled "Fuel processor for producing hydrogen rich gas" relates to a compact processor for producing a hydrogen rich gas stream from a hydrocarbon fuel for use in a fuel cell comprising a first heat exchanger, a first desulphurization reactor, a manifold for mixing the hydrocarbon fuel with an oxygen containing gas to give a fuel mixture, a second heat exchanger, an autothermal reactor, a second desulfurization reactor, a water gas shift reactor, a selective oxidation reactor and a heat exchanger.

Reference may be made to patent US 2003/0051405 discloses an apparatus for converting a hydrocarbon fuel into a hydrogen rich gas, comprising a plurality of modules stacked end to end along a common axis.

Reference may be made to patent US2003/0021742 titled "Single chamber compact fuel processor" relates to an apparatus for carrying out a multi step process of converting a hydrocarbon fuel to a substantially pure hydrogen gas feed including a plurality of reaction zones in a common reaction chamber.

Reference may be made to U.S. Pat. No. 7,066,973 titled "Integrated reformer and shift reactor" disclose a hydrocarbon fuel reformer for producing diatomic hydrogen gas. The reformer includes a first reaction vessel, a shift reactor vessel annularly disposed about the first reaction vessel, including a first shift reactor zone, and a first helical tube disposed within the first shift reactor zone having an inlet end communicating with a water supply.

Reference may be made to patent WO/2008/063485 titled "Process for production of hydrogen from carbohydrate feedstock" discloses a process for producing hydrogen from a plant source wherein a crude plant source is treated with water and a catalyst at a temperature and pressure sufficient to decompose carbohydrate material to form a vapor mixture of gases including hydrogen, and separating hydrogen mixture.

No prior art document discloses the combination of reactions selected from partial oxidation, complete oxidation, steam reforming, dry reforming, dry auto thermal reforming, auto thermal reforming, water gas shift, preferential oxidation or methanation and water condenser and separator along with $CO/CO_2$ clean-up in a single compact unit.

Further, prior designs of fuel processor require external heating for the entire process of operation from start up till shut down.

Also, the fuel processors of the prior arts generate hydrogen rich gas or syngas which needs additional equipment and/or steps to process it before it can be fed to the fuel cell/syngas feed applications.

No prior art document has disclosed the use of at least one part of a fuel processor/hydrogen or syngas generator that can be used in any combination with the others to generate hydrogen, hydrogen rich gas or syngas. The feed can also be selected from hot syngas, coal gasifier gas or any other gas stream containing $H_2$, $CO$, $CO_2$, $CH_4$, $H_2O$.

OBJECTS OF THE INVENTION

One objective of the invention is to provide a compact, desktop hydrogen as well as syn gas generator.

One more objective is to provide a hydrogen/syngas generator in which a variety of catalytic/non catalytic reactions are carried out.

Another objective of the invention is to provide a hydrogen/syngas generator in which variety of reactions can be performed without an external source of heat.

Another objective of the present invention is to provide a process for the preparation of hydrogen gas/syngas as in the said generator.

SUMMARY OF THE INVENTION

Accordingly, the invention relates to a compact desktop hydrogen/syngas generator or fuel processor to produce hydrogen/syngas to directly feed to fuel cell/syngas feeding applications. A compact fuel processor for producing hydrogen/syngas is disclosed. The invention features an improved integrated fuel reforming system, including an autothermal reformer with one or more of the following reactor sections in integrated forms selected from (but not limited to) desulfurizer, water gas shift reactors, preferential oxidation reactor or methanation reactors, CO and/or $CO_2$ absorber, condenser and water or liquid phase separator.

In one aspect, the invention features the combination of chemical reactions selected from, but not limited to partial oxidation, complete oxidation, steam reforming, dry reforming, dry auto thermal reforming, auto thermal reforming, water gas shift, preferential oxidation or methanation without external heating to directly feed hydrogen rich gas or syn gas to fuel cell or syngas feeding applications.

In another aspect of the present invention, the fuel, optionally preheated is allowed to react with air and water to produce carbon monoxide, carbon dioxide, water and hydrogen, etc in ATR and is fed to WGS and/or PrOx/methanation reactors thereby reducing its CO content and is cooled optionally combining cooling with $CO/CO_2$ clean-up in the condenser section. Further, the product gas is cooled with cold water coils in the PrOx reactor.

In an embodiment of the present invention, a hydrogen/syn-gas generator comprising of at least three concentric shells, innermost shell, middle shell and outer most shell, wherein the innermost shell (14) consists of an auto thermal reforming reactor which further comprises of a port (6) for mixing steam with fuel and air through a fuel entry port 7(a), air entry port 7(b) and a water entry port 7(c) and a sampling port (8) for measuring gas formed, the middle shell (15) comprising of a LTS WGS reactor (Low temperature water gas shift reactor) in upper section and an MTS/HTS WGS reactor (Medium temperature/High temperature water gas shift reactor) in lower section comprising of a steam coil (1) placed in between inner shell(14) & middle shell(15) and a sparger(3) being placed at the inlet of MTS/HTS (15), a sampling port (9) for measuring gas formed from MTS/HTS (15) and a sampling port (10) for measuring gas formed from LTS (15) and further, the outer most shell of the generator(16) consisting of a preferential oxidation reactor (PROX) (5) being placed in upper section and a condenser with CO and $CO_2$ clean up in middle section and a gas liquid separator in lower section, said outer most shell(16) further comprising a condenser coil (2) between shell(15)&(16) an air sparger(4) at the inlet of PROX(5), a sampling port (11) for measuring gas formed after PROX(5) and an inlet(12) &outlet (13) for coolant/co and $co_2$ absorption solution.

In another embodiment of the present invention, the generator as claimed in claim 1, comprising of a plurality of reactor sections selected from desulfurizer, auto-thermal reactor, water gas shift reactors, preferential oxidation reactor, methanation reactors, co and $co_2$ absorber thermally integrated as a single, compact, and concentric unit.

In another embodiment of the present invention, the generator as claimed in claim 1, comprising of plurality of coils for supplying steam to ATR feed preheating section, cooling product gas and absorbing CO &$CO_2$ from hydrogen rich product gas.

In another embodiment of the present invention, the generator as claimed in claim 1, wherein PrOx reactor (5) can be replaced or used in combination with methanation reactor.

In another embodiment of the present invention, the generator as claimed in claim 1, wherein parts of the said generator are constructed of metal, ceramic, refractory type, plastic, wood or a composite material.

In another embodiment of the present invention, the generator as claimed in claim 1, wherein said generator is used without using external energy.

In another embodiment of the present invention, the generator as claimed in claim 1 wherein at least 3 moles of syn gas is generated per mole of methane without using external energy.

another embodiment of the present invention, a process for the preparation of hydrogen gas/syn gas as in the generator as claimed in claim 1, wherein the said process comprising the steps of
  a. mixing the preheated fuel feed with air or steam or CO2 or to obtain a fuel mixture;
  b. partially oxidizing fuel mixture as obtained in step (a) in an autothermal reformer containing a catalyst at temperature ranging between 200-1200° C. to obtain a reformate mixture consisting of $H_2$, $N_2$, $CH_4$, CO, $CO_2$;
  c. subjecting the reformate mixture as obtained in step (b) to water gas shift reaction in a MTS/HTS water gas shift reactor to produce hydrogen containing gaseous mixture with decreased CO content followed by reacting the gaseous mixture in LTS WGS to produce hydrogen rich gas;
  d. subjecting the product gases as obtained in step (c) to preferential oxidation in a PrOx reactor or methanation reactor to obtain gaseous product containing $CO_2$ and $H_2$ by oxidation of CO into $CO_2$;
  e. cooling the gaseous product as obtained in step (d) in the condenser;
  f. or optionally passing the gaseous product as obtained in step (d) through a CO/$CO_2$ sorbent in the condenser coil to obtain pure H2 gas;
  g. passing the condensed liquid as obtained in step (e) to a liquid-gas separator where the liquid passes through the drain point and hydrogen rich gas passes out of product gas outlet to be fed directly to the fuel cell/syngas applications.

In another embodiment of the present invention, optionally subjecting fuel feed as product gases to a regenerable or non regenerable desulfurizer catalyst/absorber.

In another embodiment of the present invention, the gas generator as claimed in claim 1 comprising a combination of chemical reactions that thermally balances to give a thermoneutral or exothermic fuel generator along with desulfurizer, condenser, separator and CO/$CO_2$ absorption to directly feed syn gas to fuel cell and syngas applications without external heating.

In another embodiment of the present invention, the gas generator as claimed in claim 1, wherein fuel used is selected from methane, liquefied petroleum gas, hydrocarbon, sulphur impurity fuel feed, carbohydrates or coal gasifier gas or any gas containing reforming gases, alone or in combinations thereof.

In another embodiment of the present invention, the gas generator as claimed in claim 1, wherein CO/$CO_2$ sorbents used in step (e) are selected from the group consisting of optionally solids and gels mixed with desulfurizer, optionally solids and gels mixed with catalysts, optionally solids and gels located before the catalysts and optionally solids and gels located after catalysts.

In another embodiment of the present invention, the liquids recovered at the drain point after the liquid-gas separator in step (f) are reprocessed and reused and/or discarded as suitable.

In another embodiment of the present invention, the gas generator as claimed in claim 1, wherein said generator produces hydrogen, hydrogen rich gas or syn gas.

In another embodiment of the present invention, the generator as claimed in claim 1, wherein said generator combines reactions selected from, but not limited to PO (Partial oxidation), PO+SR (Steam reforming), PO+SR+DR (Dry reforming), PO+DR, PO+SR+DR+WGS, PO+SR+DR+WGS+PrOx and PO+WGS.

In another embodiment of the present invention, the hot gases as feed can be used as external energy if required.

BRIEF DESCRIPTION OF THE ACCOMPANYING DRAWINGS

FIG. 1 represents a compact ATR fuel processor hydrogen/syngas generator described in detail herein
Abbreviations:
ATR: Auto thermal reforming
COSORB: CO sorption
DR: Dry reforming
HTS: High temperature water gas shift reactor
LPG: Liquefied Petroleum Gas
LTS: Low temperature water gas shift reactor
MTS: Medium temperature water gas shift reactor
PO: Partial oxidation
PrOx: Preferential Oxidation reactor
SR: Steam reforming
WGS: Water gas shift reactor
FIG. 2 Gas Chromatogram showing products of ATR

DETAILED DESCRIPTION OF THE INVENTION

The present invention relates to a compact, concentric auto thermal fuel processor/hydrogen or syngas generator for production of hydrogen/syngas without any external heating. Further, the auto thermal hydrogen/syngas generator of the present invention involves combination of reactions such as partial oxidation, steam reforming, dry reforming, auto thermal reforming, water gas shift, preferential oxidation or methanation that takes place without external heating, for converting air, steam (or $CO_2$) and fuel into a reformate containing CO, $CO_2$, $N_2$, $CH_4$ and $H_2O$ which is subsequently converted to hydrogen/syngas as a feed for fuel cell or syngas applications.

The hydrogen/syngas generator consists of one or more of the following reactor sections in integrated forms selected from desulfurizer, water gas shift reactors, preferential oxidation reactor or methanation reactors, CO and/or $CO_2$ absorber, condenser and water or liquid phase separator.

The fuel generator of the invention comprises of
a) Catalytic autothermal reforming reactor
b) High temperature or medium temperature water gas shift reactor,
c) Low temperature water gas shift reactor,
d) Preferential oxidation reactor,
e) Condenser along with $CO/CO_2$ clean-up and
f) Separator.

Figure 1:
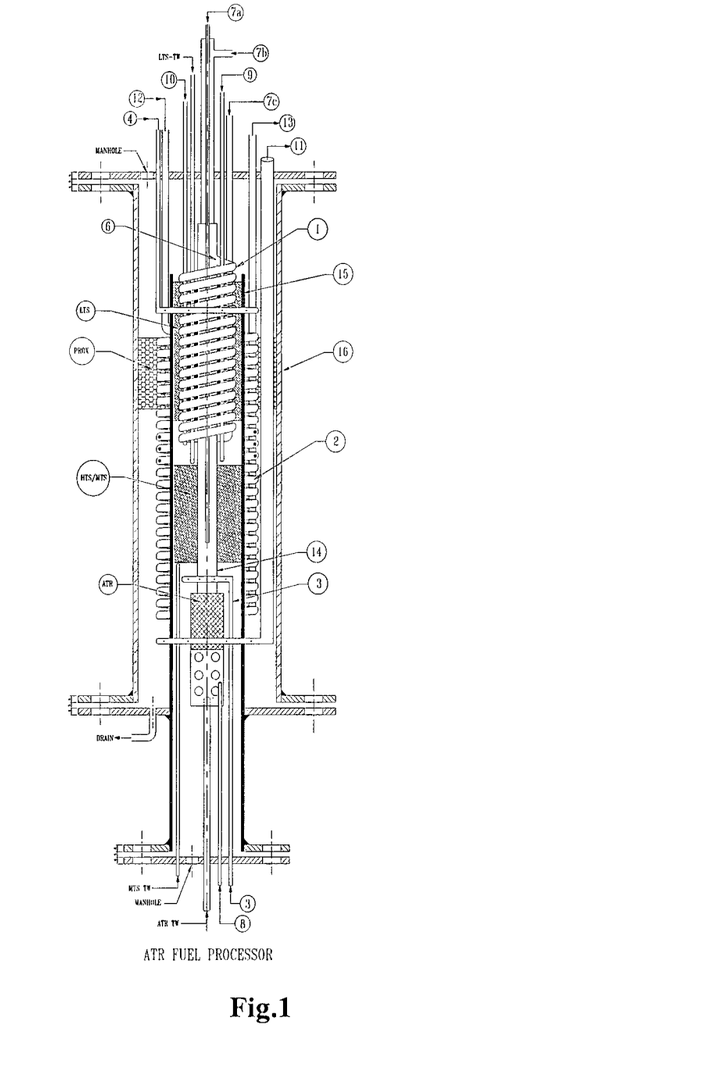
Figure 2:
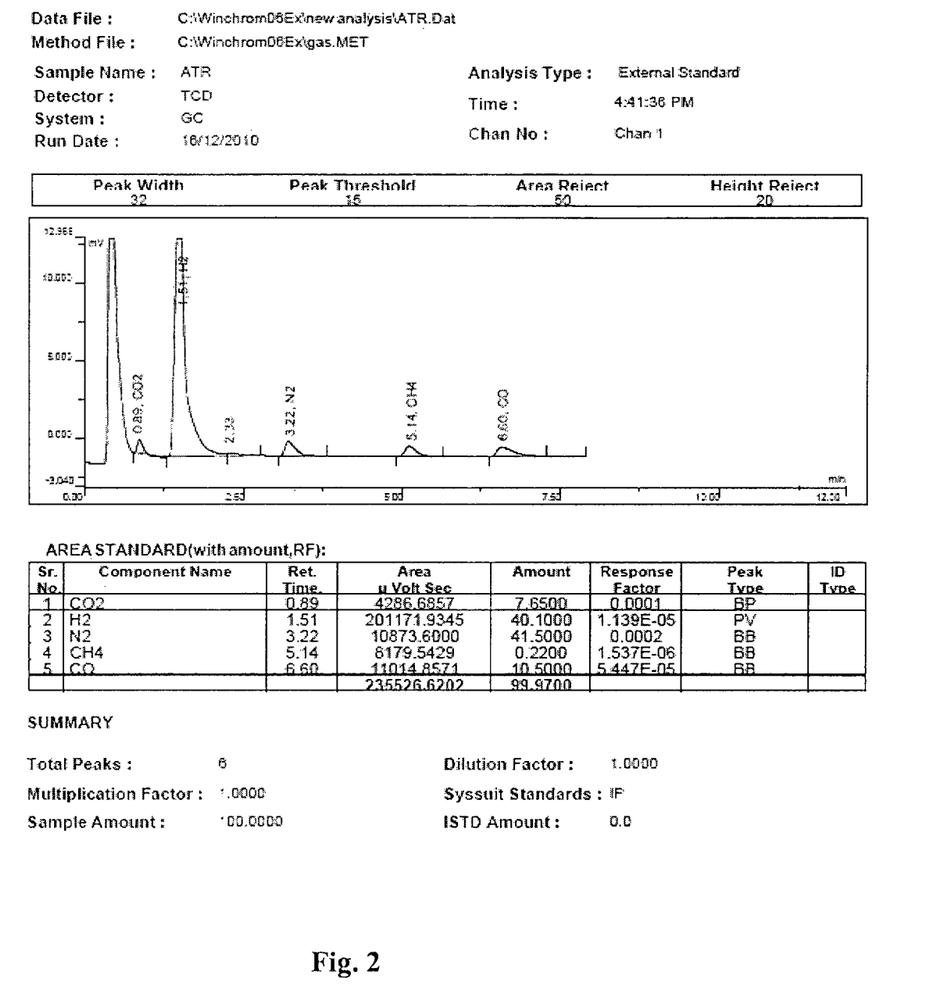
Figure 3:
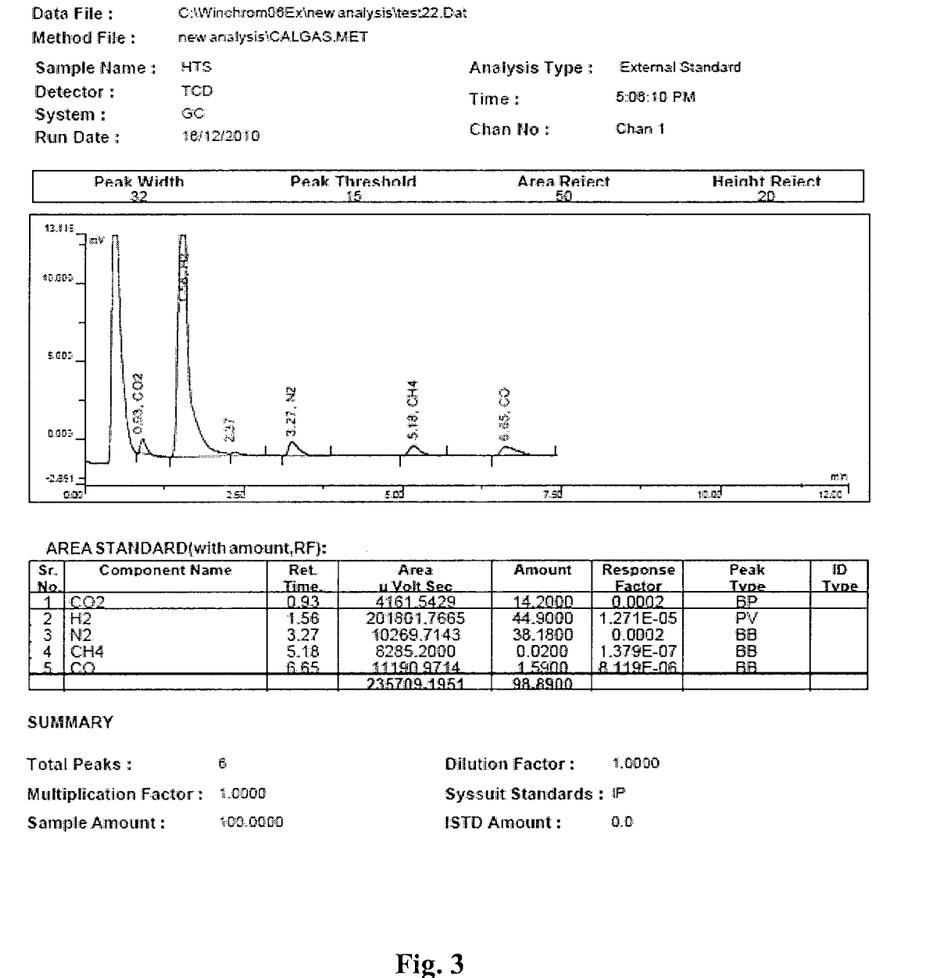
FIG. 3: Gas Chromatogram showing products of HTS
Figure 4:
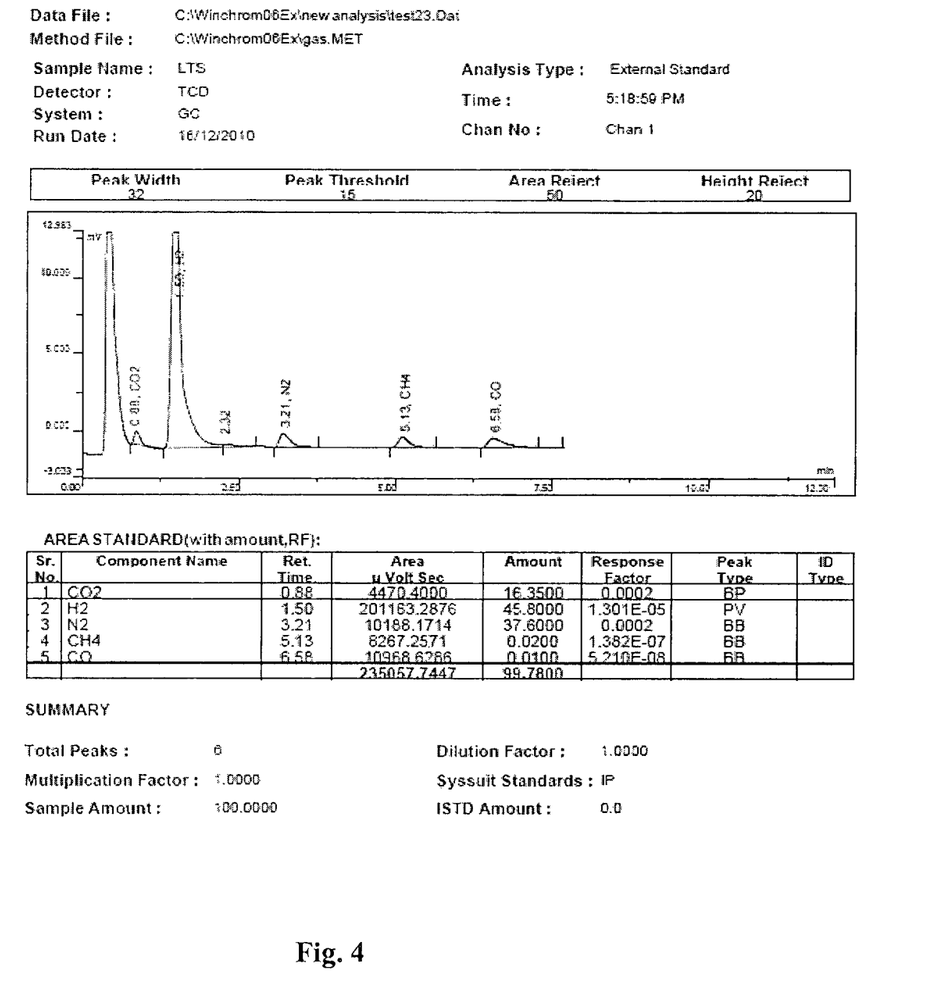
FIG. 4: Gas Chromatogram showing products of LTS
Figure 5:
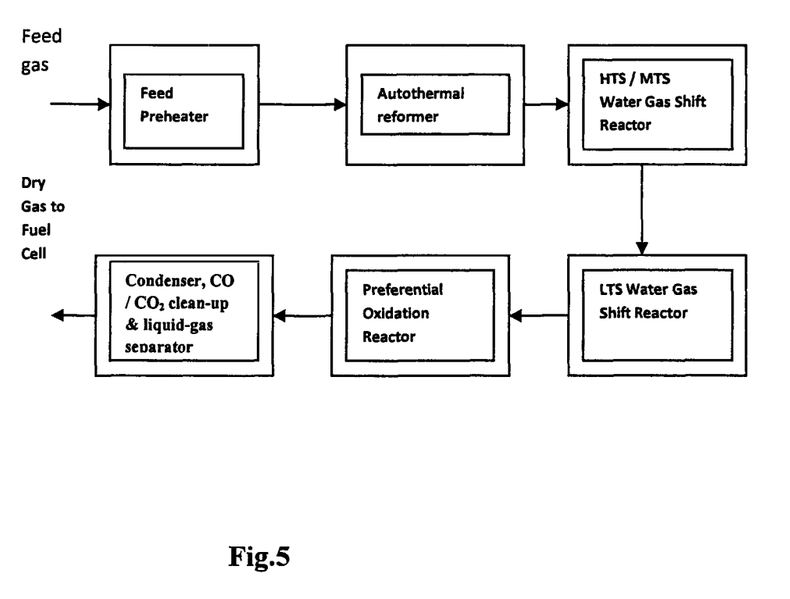
FIG. 5: schematically representation of processes

In the preferred embodiment as shown in FIG. 1, the compact hydrogen/syngas generator comprises of 3 concentric shells as described below:
(i) The innermost shell (I) (14) comprising ATR reactor (in lower section).
(ii) The middle shell (M) (15) which comprises of ( ) LTS WGS reactor (upper section) and ( ) MTS/HTS WGS reactor (lower section).
(iii) The outermost shell (O) (16) which comprises of ( ) PrOx reactor (upper section), ( ) Condenser (along with $CO/CO_2$ clean-up) (middle section) and ( ) Gas-Liquid Separator (lower section).

Further, with reference to FIG. 1, the generator comprises:
A steam coil (1) to supply steam (water) to the ATR feed preheating section which is located at upper location between shells I and M. The steam coil (1) and the wall of the upper section of the innermost shell both absorb heat from product gases and supply to feed, thereby performing the function of an integrated heat exchanger. This coil takes water from water pump (outside) and injects steam in the feed preheating area. This coil optionally has perforations to sprinkle water in the fuel generator for cooling or enhancing the water gas shift reaction conversion.

The steam coil (1) can also be used to supply $CO_2$ as feed with or without steam.

An optionally perforated condenser coil (2) is situated between shells M & O at the middle location for cooling product gas, absorbing CO and/or $CO_2$ from the hydrogen rich product gas.

A sparger (3) is at the inlet of MTS/HTS reactor to spray water on the ATR product gas to cool it to a suitable lower temperature, increase the Steam/CO ratio and to increase the GHSV (Gas hourly space velocity) of the ATR product gas.

An air sparger (4) is at the inlet of the PrOx reactor (5) marked as PrOx in FIG. 1

Port in center tube for mixing steam with air & fuel (6)

Entry ports (7a, 7b, 7c) for fuel, an entry port for air and entry port for water for ATR.

Sampling port (8) for measuring gas formed after ATR.

Sampling port (9) for measuring gas formed after MTS/HTS.

Sampling port (10) for measuring gas formed after LTS.

Sampling port for (11) measuring gas formed after PrOx.

An inlet (12) and (or) an outlet (13) for coolant/CO and/or $CO_2$ absorption solutions known in the art.

The different parts of the generator of the invention is constructed of metal, plastic, ceramic, refractory or pure or composite material or such like.

Temperature and/or pressure measuring devices are installed at desired locations in the generator.

The non-perforated condenser coil (2) carries water for cooling. In one embodiment of the generator of the invention, the perforated condenser coil (2) carries water for cooling. In another embodiment, the condenser coil (2) carries solution for $CO/CO_2$ absorption and cooling. In yet another embodiment of the invention, the generator comprises a plurality of condenser coils for carrying optionally cooling water, solution for absorption of CO or solution for absorption of $CO_2$, alone or in combinations thereof. The condenser coil optionally extends into the PrOx reactor section to extract heat of the PrOx section.

When the PrOx reactor is used, the air sparger (4) sprays air, oxygen, inert gas, alone or in combinations thereof on the LTS product gas.

The gas generated in the generator is cooled to suitable temperature as required by fuel cell/syngas feed applications.

The cooling of product gas is direct wherein the cooling water is supplied through coils.

The spargers cool the gas generated, wherein holes are introduced in the coil for sprinkling the cooling water.

The cooling is a combination of direct cooling and with holes in the coil.

In the generator, catalysts are packed at the respective reactor positions. The catalysts packed are selected from HTS/MTS/LTS catalysts, ATR catalysts, SR catalysts, PrOx catalysts, PO catalysts, desulfurizing catalysts and such like, marketed products, well known in the hydrogen generation technology. The catalysts are optionally regenerable or non regenerable. The catalysts used experimentally in the generator of the invention are Pt on alumina, G31E™ catalyst (NiO on alpha alumina) and G90LDP™ catalyst (NiO on $CaAl_{12}O_{18}$) and ATR-1 catalyst (Pt or rhodium on alumina), sourced internally or bought from M/S SudChemie. Similarly, HTS [G3C™ (composite mixture of 80% $Fe_2O_3$, $Cr_2O_3$ 8.5% and CuO 2%)] and LTS catalysts [C18™ (55% CuO, ZnO 30% and 10-15% Al2O3 and 0-2% promoters) were sourced from Sudchemie, while Pt on alumina was from both internal sources as well as Sudchemie. Lime water was used for $CO_2$ absorption.

The generator comprises hollow sections that are optionally packed with inert materials of appropriate size to affect or change heat transfer and fluid flow regime inside the generator. Such inert materials are selected from ceramic beads, ball bearings and such like materials. In one embodiment of the invention, the inert material replaces the catalysts. In another embodiment the inert materials are packed between the catalysts.

The catalysts are replaced with gas sorbents well known in the art. The gas sorbents adsorb CO and $CO_2$. The sorbents are optionally regenerable or non regenerable.

The catalysts, sorbents and inert materials of the generator are used alone or in combinations thereof. The catalysts of the generator are in the form of pellets, monoliths or such like, used alone or in combinations thereof.

A typical procedure for autothermal reforming reaction in the generator of the invention is described herein. Similar procedures for desired set of reactions and combinations of reactions are formulated and carried out in the generator.

In a reaction in the generator, fuel (e.g. methane) combines with air and water to produce carbon monoxide, carbon dioxide, water and hydrogen after ATR, WGS and/or PrOx/methanation reactors. The product gas is cooled with cold water coils in the PrOx reactor. The condenser in combination with $CO/CO_2$ clean-up cools the gas and the liquid goes to the drain point and dry gas is fed directly to fuel cell.

Oxidant in the generator of the invention is selected from air, oxygen enriched air, oxygen deficient air, oxygen combined with inert gas and such like. The fuel of the generator is selected from methane, LPG, other hydrocarbons, sulphur impurity fuel feed, carbohydrates and such like, alone or in combinations thereof. The water can be introduced as a liquid or vapor. The composition percentages of the feed are determined by the desired operating conditions.

The generator as shown in FIG. 1 is started by passing oxidant selected from air, oxygen enriched air, oxygen deficient air, either, alone or in combination with said gases in molar ratios. Oxygen generating reactions in solid, liquid or gaseous forms are optionally used in the start-up of the generator. Use of hydrogen in small quantity only for start-up may be required by the generator. Optionally hot methane (fuel) with air is used to ignition. The fuel is catalytically combusted optionally on the ATR catalyst or on a catalyst loaded prior to the ATR catalyst, which raises the temperature of the ATR catalyst. When this temperature reaches ~300° C., or as required by catalyst, the fuel flow is started first slowly and then increased to the desired value at a calculated flow rate and hydrogen flow is shut off. The partial or complete oxidation of fuel takes place on ATR catalyst which increases the temperature of ATR up to 600° C. or as suited to catalyst and the ATR product gas passes through the WGS reactor section and PrOx or methanation reactor thereby reducing its CO content and is cooled optionally combining cooling with $CO/CO_2$ clean-up in the condenser section. The condensed liquid passes through the drain point and hydrogen rich gas passes out of product gas outlet to be fed to the fuel cell. The liquids recovered at the drain point are reprocessed and reused or discarded. In one embodiment of the process, the liquids recovered at the drain point are reprocessed and reused or discarded partially.

The generator is started by using a fuel, water and air alone or in combinations thereof, optionally preheated electrically or by heat exchange mixture near ignition point of the fuel, before passing it to the generator, where the fuel and air start oxidation on ATR catalyst.

Water flow in steam coil, sparger water, air/oxygen in PrOx reactor, condenser water and or $CO/CO_2$ clean-up solutions is started at a desired flow rate first slowly and then increased/ decreased to the desired value, when temperature of the last WGS section reaches above 100° C. The autothermal reforming reaction starts on the ATR catalyst. If the temperature of the ATR product gas at the inlet of first WGS reactor increases above the catalyst required operating temperature (for e.g. >400° C. for High Temperature Shift catalyst), water sparger is started to maintain it to the desired value. The water sparger is also started to increase the GHSV of the inlet gas to the WGS section.

Air flow rate is started slowly and then increased to the desired value through the PrOx air sparger to decrease the CO amount. Alternately, in absence of PrOx reactor, methanation catalyst is used in that section to carry out the methanation reaction.

A steady state is reached when the respective reactor temperatures stabilize giving constant flow rate of gas and liquid passing out of the generator.

The generator is shut down by various options. In one embodiment, ATR water is shut down and ATR operates in partial oxidation mode. Hydrogen, nitrogen or any other inert suitable gas is again started at a calculated flow rate and fuel and all water flows along with $CO/CO_2$ absorption solutions are turned off. When the generator is completely filled with the gas, it is turned off.

The product gas generated in the generator is directly fed to the fuel cell or syngas applications. The generated gases include, but are not limited to hydrogen, hydrogen rich gas, syn gas and such like. The generated gases are optionally mixed with water, inert materials and such like before feeding to fuel cell/syngas applications, optionally providing for the need for humidified gases.

The generator uses at least one part for generating product gases. The generator of the invention uses syn gas, coal gasifier gas or any other gas containing CO, $CO_2$, $CH_4$, $H_2O$, sulfur and such like as feed and use parts of generator selected from, but not limited to MTS/HTS sections to generate product gas. Some of the combinations of reactions (but not limited to) that are carried in the generator are:

PO, PO+SR, PO+SR+DR, PO+DR, PO+SR+DR+WGS, PO+SR+DR+WGS+PrOx & PO+WGS. More combinations are possible than are exemplified herein. The examples provided below are illustrative of the invention and are not intended to limit the scope of the claimed invention. The temperatures listed for the reactions may vary depending on the catalyst and heat transfer in reactor.

Various combinations of the above reactions are carried out in the generator with catalysts known in the art and as mentioned herein.

Desulfurization is carried out in the feed section before the feed reaches the ATR catalyst. Optionally desulfurizer catalyst/sorbent is packed in the generator fuel feed line before the ATR catalyst to absorb sulfur from feed. In yet another embodiment, sulphur compounds are adsorbed after the ATR section using a sulfur adsorbent packed in the generator. In one more embodiment of the invention, the $SO_2$ type sulfur sorbent is packed outside the generator to desulfurize the product gas. Optionally desulphurization is done upstream or downstream of reactors. The desulfurizer catalyst is optionally regenerable or non regenerable and is used alone or in combinations thereof.

The generator comprises $CO/CO_2$ sorbents which are optionally solids or gels mixed with desulfurizer catalysts and are located before or after the catalysts.

The hydrogen/syn gas generator of the invention is compact and fits on a laboratory bench and performs as described and claimed herein. While it can be in sizes as big as desired in industrial scale, it can also be scaled down to micro reactor sizes and will perform as well. The size and dimensions of the hydrogen/syngas generator (fuel processor) described herein is illustrative and should not be construed to be limiting in scope for alternative dimensions as desired for the applications envisaged.

EXAMPLES

The following examples are given by way of illustration and therefore should not be construed to limit the scope of the present invention

Example 1

Partial oxidation was carried out in the generator where the reaction occurred is illustrated herein with methane as fuel:

$$Fuel + O_2(air) = CO + H_2$$

$$CH_4 + 0.5O_2 = CO + 2H_2 \,(200\text{-}1900°\,C.)$$

Example 2

Steam reforming was carried out in the generator as exemplified herein after partial oxidation.

$$Fuel + O_2(air) = CO + H_2$$

$$CH_4 + 0.5O_2 = CO + 2H_2 \,(200\text{-}1900°\,C.)$$

$$Fuel + H_2O = CO + H_2 \quad CH_4 + H_2O = CO + 3H_2$$

$$Fuel + H_2O = CO_2 + H_2O \quad CH_4 + 2H_2O = CO_2 + 4H_2 \,(200\text{-}1600°\,C.)$$

Example 3

Dry reforming was carried out as depicted herein. DR was carried out after partial oxidation and dry reforming as exemplified herein.

$$Fuel + O_2(air) = CO + H_2$$

$$CH_4 + 0.5O_2 = CO + 2H_2 \,(200\text{-}1900°\,C.)$$

$$Fuel + CO_2 = CO + H_2 \quad CH_4 + CO_2 = 2CO + 2H_2 \,(200\text{-}1600°\,C.)$$

Example 4

Water gas shift of the generator was carried out as per accompanying illustration after partial oxidation $$Fuel + O_2(air) = CO + H_2$$

$$CH_4 + 0.5O_2 = CO + 2H_2 \,(200\text{-}1900°\,C.)$$

$$CO + H_2O = CO_2 + H_2 \,(150\text{-}800°\,C.)$$

Example 5

Preferential oxidation carried out in the generator is depicted as follows:

$$CO + O_2 = CO_2 \,(60\text{-}600°\,C.)$$

Example 6

$$Fuel + O_2(air) = CO + H_2$$

$$CH_4 + 0.5O_2 = CO + 2H_2 \,(200\text{-}1900°\,C.)$$

$$Fuel + H_2O = CO + H_2 \quad CH_4 + H_2O = CO + 3H_2$$

$$Fuel + H_2O = CO_2 + H_2O \quad CH_4 + 2H_2O = CO_2 + 4H_2 \,(200\text{-}1600°\,C.)$$

$$Fuel + CO_2 = CO + H_2$$

$$CH_4 + CO_2 = 2CO + 2H_2 \,(200\text{-}1600°\,C.)$$

$$CO + H_2O = CO_2 + H_2 \,(120\text{-}800°\,C.)$$

Partial oxidation, steam reforming, dry reforming followed by water gas shift reaction was carried out as exemplified herein.

Example 7

Partial oxidation, steam reforming, dry reforming followed by water gas shift reaction and then preferential oxidation was carried out as exemplified herein.

$$Fuel + O_2(air) = CO + H_2$$

$$CH_4 + 0.5O_2 = CO + 2H_2 \,(200\text{-}1900°\,C.)$$

$$Fuel + H_2O = CO + H_2 \quad CH_4 + H_2O = CO + 3H_2$$

$$Fuel + H_2O = CO_2 + H_2O \quad CH_4 + 2H_2O = CO_2 + 4H_2 \,(200\text{-}1600°\,C.)$$

$$Fuel + CO_2 = CO + H_2$$

$$CH_4 + CO_2 = 2CO + 2H_2 \,(200\text{-}1600°\,C.)$$

$$CO + H_2O = CO_2 + H_2 \,(120\text{-}800°\,C.)$$

$$CO + O_2 = CO_2 \,(60\text{-}600°\,C.)$$

Example 8

Example of Generator Using Methane as Fuel

Conditions of ATR Reactor:
- Methane=2.5 liters/moles per minute
- Temperature=600° C. and 650° C.
- S/C Ratio=1.2
- $O_2$/C Ratio=0.6
- Pressure 1 atm Products from ATR at 600° C. (ATR-1) and 650° C. (ATR-2)

| | | |
|---|---|---|
| Temperature (° C.) | 600.00 | 650.00 |
| N2 (g) | 5.64 | 5.64 |
| H2 (g) | 4.79 | 5.31 |
| H2O (g) | 2.56 | 2.46 |
| CO (g) | 0.91 | 1.24 |
| CO2 (g) | 1.27 | 1.15 |
| CH4 (g) | 0.33 | 0.11 |
| O2 (g) | 0.00 | 0.00 |
| H2O (l) | 0.00 | 0.00 |
| C | 0.00 | 0.00 |
| Enthalpy | −38.80 | 40.40 |
| S/CO Ratio | 2.82 | 1.98 |
| Wet Gas Composition (moles/liters) | 15.49 | 15.91 |
| Dry Gas Composition (moles/liters) | 12.93 | 13.45 |
| % Dry Gas Composition | | |
| N2 (g) | 43.61 | 41.93 |
| H2 (g) | 37.04 | 39.47 |
| H2O (g) | 19.79 | 18.29 |
| CO (g) | 7.02 | 9.22 |
| CO2 (g) | 9.82 | 8.55 |
| CH4 (g) | 2.51 | 0.83 |

Products of ATR go to WGS (HTS) at S/CO Ratio=5.0.
The product gas obtained after HTS has the following composition:

| HTS temperature = 400° C. | | |
|---|---|---|
| Temperature (° C.) | ATR-1 | ATR-2 |
| N2 (g) | 5.64 | 5.64 |
| H2 (g) | 5.47 | 6.33 |
| H2O (g) | 3.87 | 5.18 |
| CO (g) | 0.23 | 0.22 |
| CO2 (g) | 1.95 | 2.17 |
| CH4 (g) | 0.33 | 0.11 |
| O2 (g) | 0.00 | 0.00 |
| H2O (l) | 0.00 | 0.00 |
| C | 0.00 | 0.00 |
| S/CO Ratio | 16.90 | 23.55 |
| Wet Gas Composition (moles/liters) | 17.48 | 19.65 |
| Dry Gas Composition (moles/liters) | 13.62 | 14.47 |
| % Dry Gas Composition | | |
| N2 (g) | 41.42 | 38.97 |
| H2 (g) | 40.18 | 43.74 |
| H2O (g) | 28.41 | 35.80 |
| CO (g) | 1.68 | 1.52 |
| CO2 (g) | 14.33 | 14.99 |
| CH4 (g) | 2.39 | 0.77 |

Products of HTS go to WGS (LTS).

The product gas obtained after LTS has the following composition:

| LTS Temperature = 200° C. | | |
|---|---|---|
| Temperature (° C.) | ATR-1 | ATR-2 |
| N2 (g) | 5.64 | 5.64 |
| H2 (g) | 5.69 | 6.54 |
| H2O (g) | 3.65 | 4.97 |
| CO (g) | 0.01 | 0.01 |
| CO2 (g) | 2.17 | 2.38 |
| CH4 (g) | 0.33 | 0.11 |
| O2 (g) | 0.00 | 0.00 |
| H2O (l) | 0.00 | 0.00 |
| C | 0.00 | 0.00 |
| S/CO Ratio | 254.48 | 373.93 |
| Wet Gas Composition (moles/liters) | 17.48 | 19.65 |
| Dry Gas Composition (moles/liters) | 13.83 | 14.68 |
| % Dry Gas Composition | | |
| N2 (g) | 40.78 | 38.43 |
| H2 (g) | 41.11 | 44.53 |
| H2O (g) | 26.42 | 33.88 |
| CO (g) | 0.10 | 0.09 |
| CO2 (g) | 15.66 | 16.19 |
| CH4 (g) | 2.35 | 0.76 |

Products of LTS go to CO & $CO_2$ absorption section.

The product gas obtained after the absorption has the following composition:

| Absorber Temperature = 50° C. | | |
|---|---|---|
| Temperature (° C.) | ATR-1 | ATR-2 |
| N2 (g) | 5.64 | 5.64 |
| H2 (g) | 5.69 | 6.54 |
| H2O (g) | 0.00 | 0.00 |
| CO (g) | 0.00 | 0.00 |
| CO2 (g) | 0.00 | 0.00 |
| CH4 (g) | 0.33 | 0.11 |
| O2 (g) | 0.00 | 0.00 |
| H2O (l) | 0.00 | 0.00 |
| C | 0.00 | 0.00 |
| Wet Gas Composition (liters/moles) | 11.65 | 12.29 |
| Dry Gas Composition (liters/moles) | 11.65 | 12.29 |
| % Dry Gas Composition | | |
| N2 (g) | 48.41 | 45.90 |
| H2 (g) | 48.80 | 53.19 |
| H2O (g) | 0.00 | 0.00 |
| CO (g) | 0.00 | 0.00 |
| CO2 (g) | 0.00 | 0.00 |
| CH4 (g) | 2.79 | 0.91 |

Advantages of the Invention

1. Compact desktop hydrogen/syngas generator
2. Can perform a variety of reactions which leads to maximum yield of hydrogen/sun gas generation
3. Can reduce the levels of CO to feed it directly to fuel cell.
4. No external source of heat needed.
5. Depending on feed and application, modules/components of generator can be selected.
6. Same generator can be used for varieties of single or combination of reactions
7. Can be used for both Hydrogen as well as syn gas generation.

I claim:

1. A hydrogen/syn gas generator having at least three concentric shells, the generator comprising:
   an inner shell including an auto thermal reforming reactor, the auto thermal reforming reactor comprising:
     a center tube configured to mix steam with fuel and air through a fuel entry port, air entry and a water entry port; and
     a first sampling port configured to measure gas formed by the auto thermal reforming reactor;
   a middle shell including a low temperature water gas shift reactor in an upper section of the middle shell and a medium to high temperature water gas shift reactor in a lower section of the middle shell, the middle shell comprising:
     a steam coil located between the inner shell and the middle shell;
     a water sparger located at the inlet of the medium to high temperature water gas shift reactor,
     a second sampling port configured to measure gas formed from the medium to high temperature water gas shift reactor; and
     a third sampling port configured to measure gas formed from the low temperature water gas shift reactor; and
   an outer shell including a preferential oxidation reactor located in an upper section of the outer shell, a condenser configured to clean up CO and $CO_2$ located in a middle section of the outer shell, and a gas liquid separator located in the lower section of the outer shell, the outer shell comprising:
     a condenser coil located between the middle shell and the outer shell;
     an air sparger located at the inlet of the preferential oxidation reactor;
     a fourth sampling port configured to measure gas formed from the preferential oxidation reactor; and
     an inlet and an outlet for coolant or CO and $CO_2$ absorption solution.

2. The generator as claimed in claim 1, further comprising a plurality of reactor sections selected from the group consisting of desulfurizers, methanation reactors, and CO and $CO_2$ absorbers,
wherein the auto-thermal reactor, water gas shift reactors, preferential oxidation reactor, and plurality of reactor sections are thermally integrated as a single, compact, and concentric unit.

3. The generator as claimed in claim 1, further comprising a plurality of coils configured to supply steam to an auto thermal reforming feed preheating section to cool hydrogen rich gas formed from the low temperature water gas shift reactor and to absorb CO and $CO_2$ from the hydrogen rich gas.

4. The generator as claimed in claim 1, wherein the preferential oxidation reactor can be replaced by or used in combination with a methanation reactor.

5. The generator as claimed in claim 1, wherein the generator is constructed of a metal, a ceramic, a refractory type material, a plastic, a wood or a composite material.

6. The generator as claimed in claim 1, wherein the generator is configured to operate without external energy.

7. The generator as claimed in claim 6, wherein at least 3 moles of syn gas is generated per mole of methane without using external energy.

8. The gas generator as claimed in claim 1, wherein the generator is a thermoneutral or exothermic fuel generator configured to execute a combination of thermally balanced chemical reactions along with a desulfurizer, a condenser, a separator and a CO and $CO_2$ absorber to directly feed syn gas to fuel cell and syn gas applications without external heating.

9. The generator as claimed in claim 1, wherein the generator combines reactions selected from the group comprising partial oxidation, steam reforming, dry reforming, preferential oxidation and water gas shift.

10. The generator as claimed in claim 1, wherein hot gases are fed as external energy.

11. The gas generator as claimed in claim 1, wherein the generator produces hydrogen, hydrogen rich gas or syn gas.

12. A process for the preparation of hydrogen/syn gas in a generator as claimed in claim 1, wherein the process comprises:
a. mixing preheated fuel with at least one of air, steam and $CO_2$ to obtain a fuel mixture;
b. partially oxidizing the fuel mixture obtained in step (a) in an autothermal reformer containing a catalyst at a temperature in the range of 200 to 1200° C. to obtain a reformate mixture consisting of $H_2$, $N_2$, $CH_4$, CO, and $CO_2$;
c. subjecting the reformate mixture obtained in step (b) to a water gas shift reaction in a medium to high temperature water gas shift reactor to produce a hydrogen containing gaseous mixture with decreased CO content followed by reacting the gaseous mixture in a low temperature water gas shift reactor to produce hydrogen rich gas;
d. subjecting the hydrogen rich gas obtained in step (c) to preferential oxidation in a preferential oxidation reactor or methanation reactor to obtain gaseous product containing $CO_2$ and $H_2$ by oxidation of CO into $CO_2$;
e. cooling the gaseous product obtained in step (d) in the condenser to obtain a condensed liquid;
f. optionally passing the gaseous product obtained in step (d) through a CO and $CO_2$ sorbent in the condenser coil to obtain pure $H_2$ gas; and
g. passing the condensed liquid obtained in step (e) to a liquid-gas separator where the liquid passes through a drain point and the hydrogen rich gas passes out of a product gas outlet to be fed directly to fuel cell or syn gas applications.

13. The process as claimed in claim 12, wherein the catalyst is selected from the group consisting of Pt on alumina, NiO on alpha alumina, NiO on $CaAl_{12}O_{18}$, Pt or rhodium on alumina, a composite mixture of CuO 55%, ZnO 30%, $Al_2O_3$ 10-15% and 0-2% promoters, and a composite mixture of $Fe_2O_3$ 80%, $Cr_3O_3$ 8.5% and CuO 2%.

14. The process as claimed in claim 12, further comprising optionally subjecting the hydrogen rich gas obtained in step (c) to a regenerable or non-regenerable desulfurizer catalyst or absorber.

15. The process as claimed in claim 12, wherein the fuel is selected from the group consisting of methane, liquefied petroleum gas, hydrocarbon, sulphur impurity fuel, carbohydrates or coal gasifier gas or any gas containing reforming gases, and mixtures thereof.

16. The process as claimed in claim 12, wherein the CO and $CO_2$ sorbent used in step (f) is selected from the group consisting of solids and gels mixed with a desulfurizer, solids and gels mixed with the catalyst, solids and gels located before the catalyst, and solids and gels located after the catalyst.

17. A process as claimed in claim 12, wherein liquids recovered at the drain point after the liquid-gas separator in step (g) are reprocessed and reused or discarded.

* * * * *